J. S. RUTKOWSKI & W. T. HUTCHISON.
FRONT WHEEL DRIVE AND STEER FOR MOTOR VEHICLES.
APPLICATION FILED SEPT. 23, 1912.
1,080,591.
Patented Dec. 9, 1913.
2 SHEETS—SHEET 1.
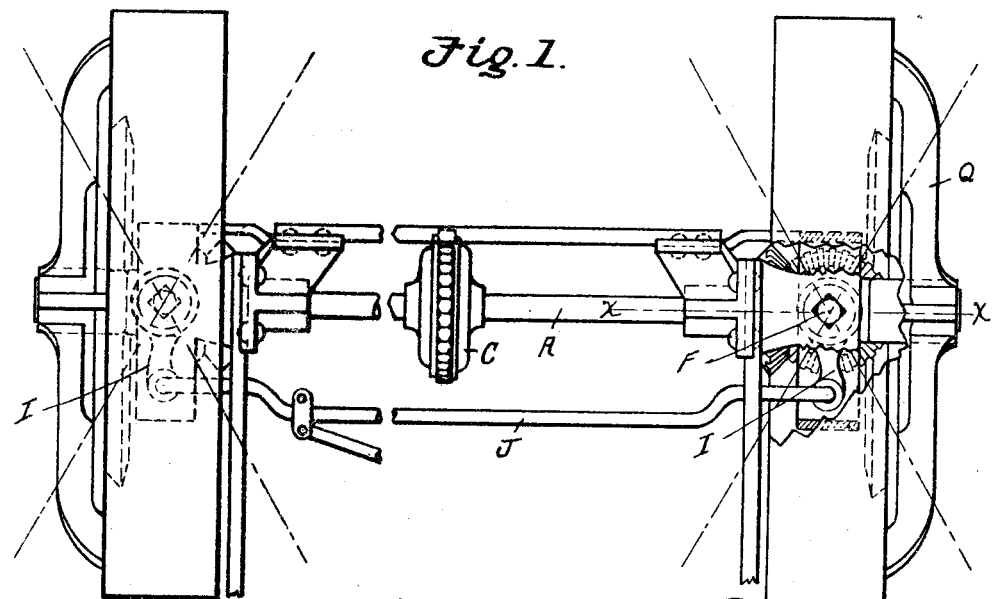
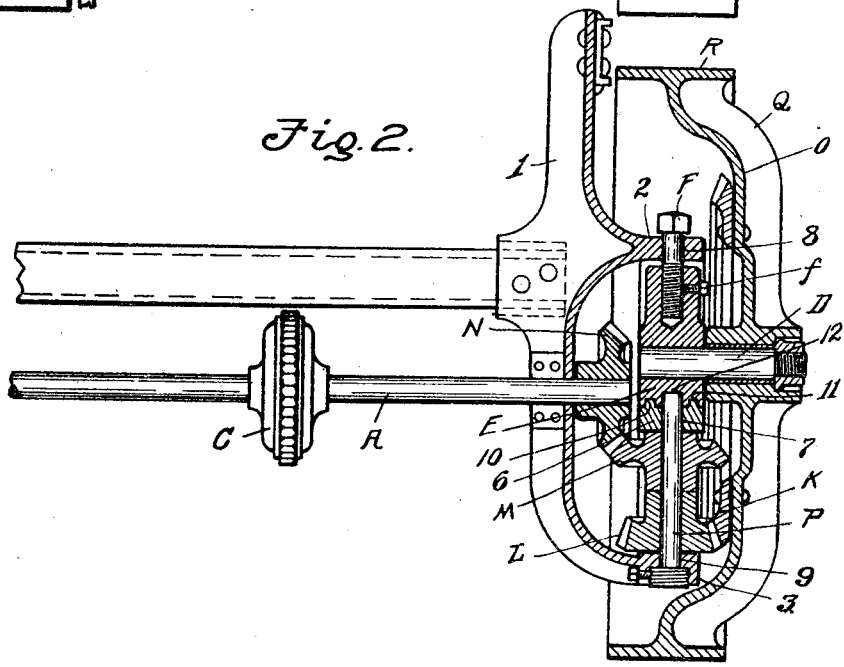
Witnesses:
JOHN S. RUTKOWSKI.
WILLIAM T. HUTCHISON.
INVENTORS.
By George J. Oltsch
ATTORNEY.

J. S. RUTKOWSKI & W. T. HUTCHISON.
FRONT WHEEL DRIVE AND STEER FOR MOTOR VEHICLES.
APPLICATION FILED SEPT. 23, 1912.
1,080,591.
Patented Dec. 9, 1913.
2 SHEETS—SHEET 2.
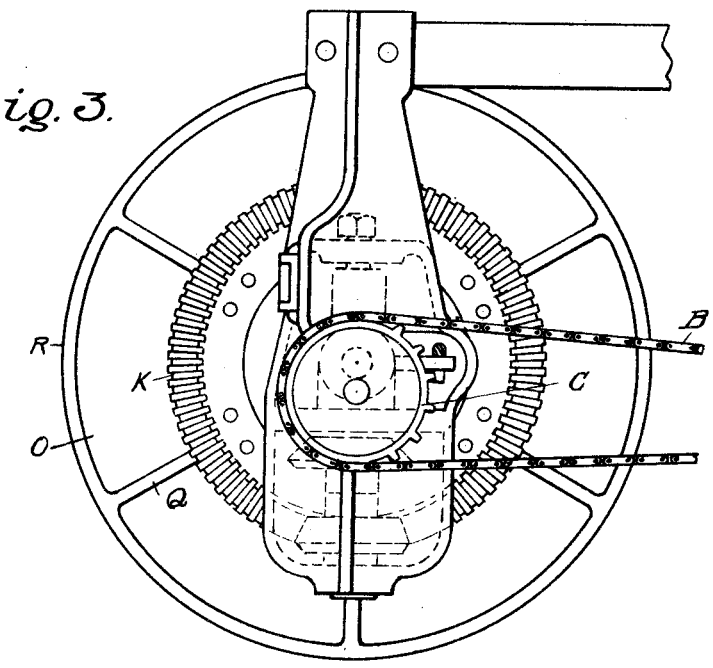
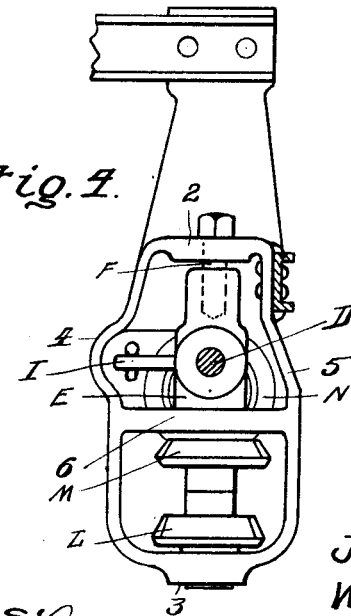
John S. Rutkowski.
William T. Hutchison.
Inventors.

UNITED STATES PATENT OFFICE.

JOHN S. RUTKOWSKI AND WILLIAM T. HUTCHISON, OF SOUTH BEND, INDIANA; SAID RUTKOWSKI ASSIGNOR TO SAID HUTCHISON.

FRONT-WHEEL DRIVE AND STEER FOR MOTOR-VEHICLES.

1,080,591.

Specification of Letters Patent.      Patented Dec. 9, 1913.

Application filed September 23, 1912. Serial No. 721,841.

*To all whom it may concern:*

Be it known that we, JOHN S. RUTKOWSKI and WILLIAM T. HUTCHISON, citizens of the United States, residing at South Bend, in the county of St. Joseph and State of Indiana, have invented certain new and useful Improvements in Front-Wheel Drives and Steers for Motor-Vehicles, of which the following is a specification.

Our invention relates to a combined wheel drive and steering gear for motor vehicles, preferably for traction engines, tractors, and the like, and is particularly adapted for use as a front wheel drive and steering gear.

It is one of the objects of our invention to provide a compact, durable and comparatively simple means consisting of a small number of parts whereby the front wheels of the vehicle or tractor may be power driven and at the same time may be easily steered to determine the direction of travel of the vehicle with little effort on the part of the driver or chauffeur.

A still further object of our invention is to provide a construction of this character in which the driving gear for the front wheels will at all times be in mesh, no matter at what angle the traction wheels may be turned relative to the driving gear.

A still further object of our invention is to house the gearing for the wheel within the wheels, so that the gearing may be substantially inclosed and protected.

With these and other objects in view, the present invention consists in the combination and arrangement of parts hereinafter more fully described, illustrated in the accompanying drawings, and particularly pointed out in the appended claims, it being understood that changes may be made in the form, proportions, size, and minor details without departing from the scope or sacrificing any of the objects of the invention.

Of the drawings, Figure 1 is a plan view of our invention with parts broken away to disclose the driving gears for one of the wheels; Fig. 2 is a vertical section on the line *x—x* of Fig. 1, with the shafts A, D and P shown in elevation; Fig. 3 is a side elevation of one of the front wheels embodying our invention, viewed from the inner side of the vehicle; and Fig. 4 is a side elevation viewed from the outside of the vehicle with the traction wheel removed.

Upon referring to the drawings, A is the front driving shaft or axle, driven by means of the sprocket chain B passing over the sprocket wheel C on the shaft or axle A. The axle A has its ends journaled in suitable castings, at each forward end of the machine, which castings are substantially identical, so that a description of one will suffice for a clear understanding of both.

Each casting 1 has lateral extensions 2 and 3 preferably disposed substantially horizontally and connected by vertical side walls 4 and 5. Connecting the side walls 4 and 5, intermediate the extensions 2 and 3, is a shelf or partition 6 having an opening 7 extending vertically therethrough. The opening 7 is disposed in vertical alinement with the openings 8 and 9 in the extensions 2 and 3, respectively, and is surrounded by an annular upstanding rib or ridge 10 concentric with the opening 7.

Supported on the shelf or partition 6 is a steering head E having in its bottom surface an annular groove 11 to receive the rib 10 whereby the head E may be turned on the shelf 6. A pivot member F extends through the opening 8 in the extension 2 and is secured to the head E in any suitable manner. The pivot F is shown as screwed into the head E and locked by means of the set screw *f*, but any other manner of fastening the pivot F in the head E will suffice as this does not constitute one of the salient features of our invention.

Carried by the head E is a stub shaft D on the end of which is rotatably mounted the traction wheel O. The stub shaft D may be disposed slightly above the plane of the axle A but in vertical alinement with the axle A.

In the bottom surface of the head E concentric with the annular groove 11 is a socket 12 in which is mounted one end of a counter-shaft P, which projects through the opening 7 in the partition 6 and has its other or lower end mounted in the opening 9 of the extension 3. The counter-shaft P is disposed substantially in vertical alinement with the pivot F and rotatably mounted on this counter shaft P are beveled gears L and M which are keyed or otherwise secured to each other so as to rotate together. Meshing with the beveled gear L is a large beveled gear K carried by the traction wheel O and meshing with the beveled gear M is the driving gear N mounted on the end of the driving axle A.

The large gear K is shown secured to the spokes of the traction wheel O, but any other manner of mounting this gear K on the wheel O may be employed.

The spokes Q of the wheel O are bent inwardly intermediate their ends so that the tire or rim R of the wheel O is disposed in substantially the same vertical plane with the steering head E so that the pivotal point of the steering head constitutes the exact vertical center of the wheel. The bent spokes Q and the rim R also constitute a housing whereby the driving gears of the wheels are inclosed and protected. Formed integral with each steering head E are arms I connected by a rod J which in turn is connected with a steering wheel or lever (not shown) so that by shifting the rod J transversely of the vehicle the steering heads which carry the stub shafts upon which the wheels are mounted are swung in unison.

It will be seen that the beveled gears L and M have their axes in alinement with the pivots of the steering gear on which pivots the traction wheels are swung. It will also be seen that the distance between the driven gear K of the traction wheel and the pivots of the steering head E is equal to the radius of the gear L which meshes with the driven gear K so that the gears K and L will always be in mesh, regardless of the angle at which the traction wheels may be turned relative to the driving wheel.

In steering, the wheels will always be in parallelism, as indicated by dotted lines in Fig. 1, and the wheels may be turned when at a stand-still by virtue of the pivot point of the steering head being in the exact center of the wheel, which is impossible with the heavy tractors now in use in which the wheels are mounted and steered as on an automobile, one wheel being advanced and the other retracted.

Having thus described our invention, what we claim is:—

1. In a device of the character described, comprising a casting consisting of lateral extensions connected by vertical side walls, the lateral extensions provided with alining openings, a transverse partition connecting the vertical side walls intermediate the lateral extension, said partition being provided with an opening in alinement with the openings in the lateral extensions with an annular rib surrounding the opening in the partition, a steering head supported on the partition of the casting, said steering head being provided in its bottom surface with an annular groove to receive the rib of the partition, pivots on which the steering head may turn, a stub shaft carried by the steering head, a traction wheel rotatively mounted on the stub shaft, means for swinging the steering head upon its pivots, and means for driving the traction wheel.

2. In a device of the character described, comprising a casting having upper and lower lateral extensions connected by vertical side walls, the lateral extensions provided with alining openings, a transverse partition connecting the vertical side walls intermediate the lateral extensions and having an opening in alinement with the openings in said extensions, an annular rib surrounding the opening in the transverse partition, a steering head supported on the transverse partition and provided in its bottom surface with a circular socket and an annular groove concentric with said socket to receive the rib of the partition, a pivot member supporting the upper end of the steering head, a shaft supported on the lower lateral extension and its upper end extending through said partition into the socket in the steering head, a stub shaft carried by the steering head, a traction wheel mounted on the stub shaft, a driven gear on the traction wheel, a driving gear supported by the casting, and intermediate gears mounted on said shaft for mesh with said driving and driven gears.

In testimony whereof we affix our signatures in presence of two witnesses.

JOHN S. RUTKOWSKI.
WILLIAM T. HUTCHISON.

Witnesses:
L. M. HAMMERSCHMIDT,
GEORGE OLTSCH.